United States Patent [19]

Busseniers et al.

[11] Patent Number: 4,470,792
[45] Date of Patent: Sep. 11, 1984

[54] PLANT FOR ROLLING-UP AND TRANSFER OF BISCUITS

[75] Inventors: Roger Busseniers, Brussels; Martial Deudon, Sint-Kruis, both of Belgium

[73] Assignee: N.V. Biscuits Delacre S.A., Vilvoorde, Belgium

[21] Appl. No.: 500,237

[22] Filed: Jun. 1, 1983

[30] Foreign Application Priority Data

Jun. 4, 1982 [BE] Belgium .................. PV 0/208273

[51] Int. Cl.³ .............................................. A21C 3/06
[52] U.S. Cl. .................................. 425/335; 425/373; 425/391
[58] Field of Search ............... 425/319, 320, 321, 322, 425/373, 334, 335, 391

[56] References Cited

U.S. PATENT DOCUMENTS

| | | | |
|---|---|---|---|
| 1,729,674 | 10/1929 | Lauterbur | 425/322 |
| 3,947,179 | 3/1976 | Kemper | 425/320 |

FOREIGN PATENT DOCUMENTS

| | | | |
|---|---|---|---|
| 613767 | 8/1933 | Fed. Rep. of Germany | 425/319 |
| 695533 | 8/1940 | Fed. Rep. of Germany | 425/321 |
| 634573 | 9/1926 | France | 425/321 |
| 490957 | 8/1938 | United Kingdom | 425/320 |

Primary Examiner—Willard E. Hoag
Attorney, Agent, or Firm—Watson, Cole, Grindle & Watson

[57] ABSTRACT

A plant providing rolling-up of a portion of baked paste between a roller-up mandrel and a belt applied on about half the surface of the roller-up mandrel, and transfer of the so formed rolled-up biscuit, the latter being of a double thickness on a portion of its surface, this paste for biscuit formation being presented by a deflector plate into the space existing between said roller-up mandrel and said belt, this plant being comprised of an intermittently rotating barrel which is equipped with a number of roller-up mandrels freely rotating on said barrel, so that axes of roller-up mandrels are parallel to the axis of said barrel, an oscillating arm alternately moved in a plane perpendicular to the barrel axis, said oscillating arm being provided with two guide cylinders on which said belt moves, said belt being arranged in such a manner on said oscillating arm, with respect to a roller-up mandrel, in the rest position of the barrel, so as to allow reception of a rolled-up paste portion from said deflector plate, that this belt covers said roller-up mandrel on at least 120° of its surface.

12 Claims, 3 Drawing Figures

PLANT FOR ROLLING-UP AND TRANSFER OF BISCUITS

This invention relates to a plant providing rolling-up of a portion of baked paste between a roller-up mandrel and a belt applied on about half the surface of the roller-up mandrel, and transfer of the cylindrical rolled-up biscuit so formed, the latter having a double thickness on a portion of its surface, this paste being presented on a deflector plate into the space existing between said roller-up mandrel and said belt.

It is known to manufacture cylindrically-shaped biscuits, obtained by rolling-up a portion of paste, between a roller-up mandrel and a belt intermittently applied on a portion of the roller-up mandrel.

Presntely known machines, which are able to produce such biscuits, not only have a production capacity which is considered as being not sufficient but moreover they are not created to allow a machine deposit of the biscuits into suitable receptables; biscuits fall without being intercepted so that a high percentage of said biscuits are broken up or damaged, which correspondingly decreases the production rate of the machine.

Another object of this invention consists of providing a plant which in addition to its high production rate is of a compact construction allowing an extremely simplified assembly and disassembly of the essential elements forming the plant.

To this end, according to the invention, the plant is comprised of an intermittently rotating barrel which is equipped with a number of roller-up mandrels freely rotating on said barrel, so that axes of roller-up mandrels are perpendicular to the plane wherein the barrel is being rotated, an oscillating arm alternately moved in a plane parallel to that wherein said barrel rotates, said oscillating arm being provided with two guide cylinders on which said belt moves, said belt being arranged in such a manner on said oscillating arm, with respect to a roller-up mandrel, in the rest position of the barrel, so as to allow reception of a rolled-up paste portion from said deflector plate, that this belt covers said roller-up mandrel on at least 120° of its surface.

Also according to the invention, each roller-up mandrel is moreover provided with a ejector of rolled-up biscuit, formed by a cylindrical member able to slide under the control of an ejection member along the roller-up mandrel in order to discharge the rolled-up biscuit, the latter being collected in the extension of said roller-up mandrel.

A feature of the invention resides in that said oscillating arm has a bent end on which both said guide cylinders are arranged, between which is provided a cavity the profile of which is adapted to the diameter of the roller-up mandrel and the depth of which, with respect to said mandrel in rolling-up position, is high enough so as to guide said belt on at least 120° about said roller-up mandrel.

Other details and advantages of the invention will become apparent from the following description of a plant allowing to roll-up and transfer biscuits according to the invention. This description is given by way of example only and does not limit the invention. Reference numerals relate to annexed figures.

Figure 3:
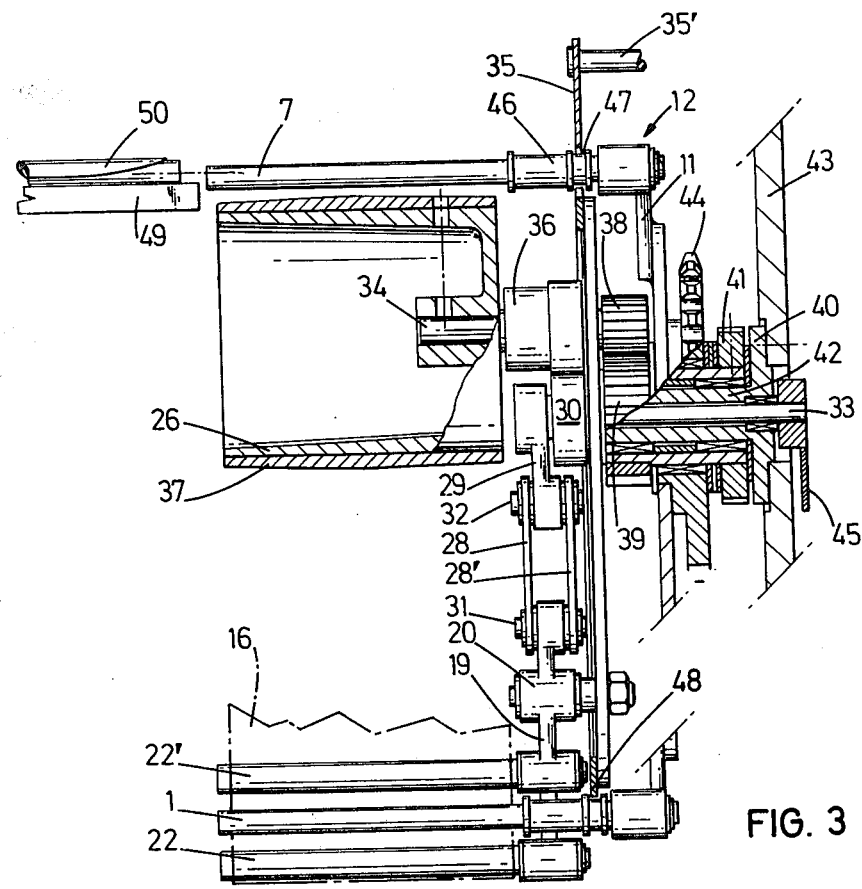
FIG. 3 is a front partly sectional and partly broken view of the plant.

The plant shown by said figures essentially comprises a barrel made of a series of roller-up mandrels 1 to 10, freely rotating on a ring 11 which itself is stepwisely rotated, as it will be seen in relation with the description of FIG. 3. The assembly comprised of ring 11 and roller-up mandrels 1 to 10 arranged perpendicularly to the plane of this ring is named barrel and is generally designated by 12.

Roller-up mandrels are cylindrically shaped and paste portions 13 (FIG. 2) brought by means of a conveyor belt 14 or a similar device each arrive on one of the roller-up mandrels 1 to 10 through a deflector plate 15. The baked but still soft paste is however firm enough to reach a roller-up mandrel (FIG. 2) and to be caught between said mandrel and belt 16.

Figure 2:
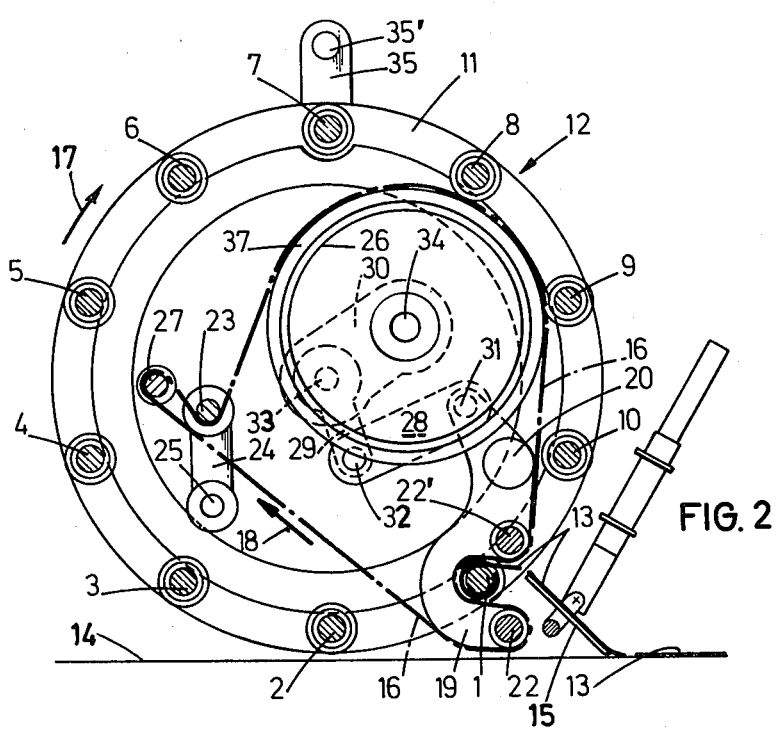
FIG. 2 is a side view of the plant according to the invention in rolling-up position of a portion of paste on a roller-up mandrel.

On FIG. 2, roller-up mandrel 1 is in rolling-up position and when considering the rotation direction of the barrel 12 such as shown by arrow 17 it may be supposed that roller-up mandrels 2 to 7 are loaded with a freshly rolled-up paste cylinder, the ejection of the paste cylinder being assumed as made at the level of the roller-up mandrel 7 (FIG. 2), thanks to means which will be described with reference to FIG. 3. The displacement direction of belt 16 is indicated by arrow 18.

The rolling-up of the paste around the roller-up mandrel is made under conditions allowing a high production rate due to the conception of the oscillating arm 19 pivoting about shaft 20. The oscillating arm is shown in retracted position on FIG. 1 and in working position or position of biscuit rolling-up on FIG. 2.

On both sides of a cavity or hollow 21, provided at the end of the oscillating arm, two guide cylinders 22 and 22' on which belt 16 passes are arranged, also freely rotating.

In the rolling-up position of a biscuit (FIG. 2), guide cylinders 22 and 22' are located at such a distance with respect to the mandrel with which they cooperate that the paste portion carried along from the deflector plate 15 completely rolls up about this mandrel.

Tension of the belt 16 is regulated by means of a tensioning cylinder 23 arranged on a pivoting arm 24 oscillating about a shaft 25. The tensioning cylinder 23 is located between a drum 26 which drives belt 16 and a reversing cylinder 27.

Figure 1:
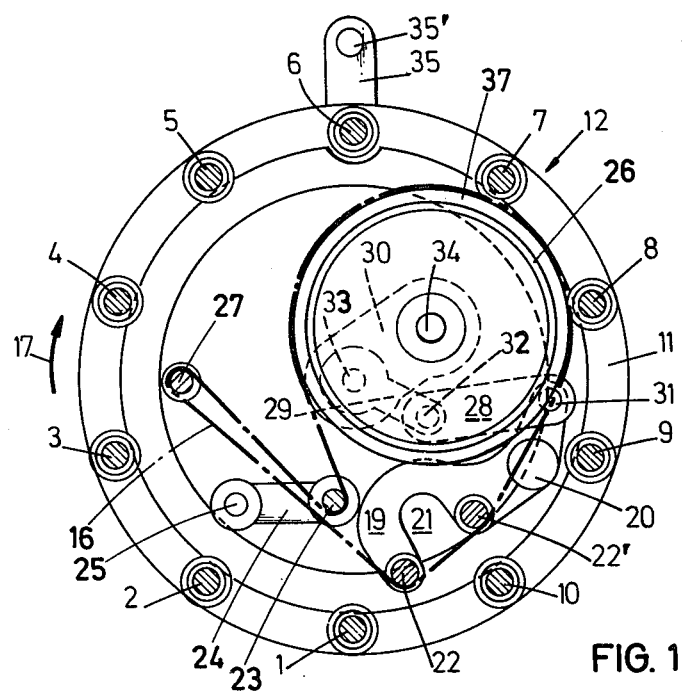
FIG. 1 is a side view of the plant, the oscillating arm being in a retracted position with respect to the circular path of the roller-up mandrels of the barrel.

A return spring, not shown by figures, is apted to push back the pivoting arm to the position such as shown on FIG. 1, corresponding to the so-called retracted position of the oscillating arm 19 with respect to the circular path of roller-up mandrels 1 to 10.

While drum 26 is continuously driven and barrel 12 has a stepwise movement thanks to an assembly of means such as shown by FIG. 3, the oscillating arm 19 is intermittently moved about shaft 20 by means of a set of lever arms 28—28', a connecting rod 29 and a member 30.

Both lever arms 28—28' pivot about shafts 31 and 32 while the connecting rod 29 only pivots about shaft 32. The reason for the existence of members 30 and 36 is for construction purposes only. As a matter of fact, member 30 is, on the one hand, used as a housing for needle bearings of shaft 34 and, on the other hand, as a housing for shaft 32. Member 36 is an extension of member 30, wherein a second set of needle bearings of shaft 34 is arranged.

The driving shaft 34 is that which continuously rotates the drum 26 transmitting itself its motion to belt 16. The driving drum 26 bears a liner 37 which improves the motion transmission to belt 16.

The continuous rotation of shaft 34 is obtained from gear 38 fixed on one end of shaft 34 on the side of ring 11, which bears the various roller-up mandrels 1 to 10.

Gear 38 is itself driven by gear 39 forming part of the collar 40 on which is fixed a pulley 41 driven by means of a serrated belt. The latter is driven by a conventional controlling device (not shown).

The collar 40 bearing gear 39 and pulley 41 is arranged around a hollow shaft 42 through needle bearings. Hollow shaft 42 is fixed with respect to the plant frame structure, schematically illustrated in part by sheet 43.

In order to control the stepwise movement of barrel 12 and thus of ring 11 bearing roller-up mandrels, one uses a gear 44 driven by a chain wheel which is itself driven by means (not shown) causing step-by-step movement of the chain and of the chain wheel 44. The latter is fixed on ring 11.

Finally, the alternating movement of shaft 33 on one end of which a head of the connecting rod 29 is fixed is caused by the rocking movement given to lever 45 partly shown on FIG. 3. Lever 45 is rocked as a pendulum thanks to any known means useful to this end.

Each roller-up mandrel bears an ejector 46 comprised of a hollow cylinder able to slide along the cylindrical body of the mandrel. Due to a groove 47 of this ejector wherein the peripheral rim of a guide member 48 enters, the ejector 46 is maintained in the retracted position as shown on FIG. 3.

When the barrel is rotating, if a roller-up mandrel comes, for example to the position of mandrel 7 (FIG. 2), the ejector 46 can be displaced by a finger-shaped ejecting member 35, mounted on a rod 35' and penetrating into groove 47 while being translated along the shaft of the roller-up mandrel when the latter is arrived at the position of "ejection". During rotation of barrel 12, the groove 47 of ejector comes into the same plane as ejecting member 35 which is located, at the rest position, in the same plane as guide member 48. To allow this translation movement of ejector 46, guide member 48 which forms a part of fixed elements of the plant is interrupted in order to allow ejector 46 to be liberated from said guide member.

Biscuits moved along the roller-up mandrel by ejector 46 are collected in the extension of said mandrel by any packaging or transfer means moving at a rate corresponding to that at which mandrels of barrel 12 successively present themselves during the stepwise rotation of said barrel.

On FIG. 3, transfer and packaging means are schematically illustrated by reference numeral 49 and biscuit by reference numeral 50.

In order to increase the feeding rate of said packaging or transfer means, it is possible to arrange a second plant of the same type as that which has been described, in a symmetrical position with respect to the latter. That amounts to arranging these plants in such a way with respect to a common conveyor belt or any other transfer means, that biscuits are ejected from roller-up mandrels on both sides of said packaging or transfer means. If one considers that roller-up mandrel 7 on FIG. 2 is in a position of ejection of a rolled-up biscuit, the second plant can be located so that biscuits are ejected by this plant in about the extension of the geometrical axis of roller-up mandrel 8 shown by FIG. 2.

It may be deduced from the preceding description that the plant according to the invention is of a particularly designed compacity, while means causing biscuit rolling-up and their movement up to the ejection point are of a very high simplicity, which allows construction sturdiness to be obtained being particularly favourable to a very high production rate.

The invention is however not limited to the just described embodiment and many changes could be brought therein without departing from the scope of the present patent application.

We claim:

1. A plant providing rolling-up of a portion of baked paste between a roller-up mandrel and a belt applied on about half the surface of the roller-up mandrel, and transfer of the so formed rolled-up biscuit, the latter being of a double thickness on a portion of its surface, this paste for biscuit formation being presented by a deflector plate into the space existing between said roller-up mandrel and said belt, this plant being characterised in that it is comprised of an intermittently rotating barrel (12) which is equipped with a number of roller-up mandrels 1 to 10 freely rotating on said barrel, so that axes of roller-up madndrels are parallel to the axis of the barrell is being rotated, an oscillating arm (19) alternately moves in a plane parallel to the barrel axis, said oscillating arm being provided with two guide cylinders (22, 22') on which said belt (16) moves, said belt being arranged in such a manner on said oscillating arm(19), with respect to a roller-up mandrel, in the rest position of the barrel, so as to allow reception of a rolled-up paste portion from said deflector plate (15), that this belt 16 covers said roller-up mandrel on at least 120° of its surface.

2. A plant as claimed in claim 1, characterised in that each roller-up mandrel (1 to 10) is moreover provided with a ejector (46) of rolled-up biscuit, formed by a cylindrical member able to slide under the control of an ejection member along the roller-up mandrel in order to discharge the rolled-up biscuit, the latter being collected in the extension of said roller-up mandrel.

3. A plant as claimed in claim 1, characterised in that said oscillating arm (19) has a bent end on which both said guide cylinders (22, 22') are arranged, between which is provided a cavity (21) the profile of which is adapted to the diameter of the roller-up mandrel and the depth of which, with respect to said mandrel in rolling-up position, is high enough so as to guide said belt (16) on at least 120° about said roller-up mandrel.

4. A plant as claimed in claim 1, characterised in that said oscillating arm (19) pivots about shaft (20) located between said bent end and a free end of the same oscillating arm (19), which is articulated on a lever arm (28) which transmits its alternating movement thereto.

5. A plant as claimed in claim 4, characterised in that the extent of alternating movement of said oscillating arm (19), in the direction of the center of barrel (12), is high enough to allow roller-up mandrels (1 to 10) passing out of range of guide cylinders (22, 22')of which the bent end of said oscillating arm (19) is equipped.

6. A plant as claimed in claim 4, characterised in that lever arms (28,28') giving the oscillating arm (19) its alternating movement are articulated to a connecting rod (29) one of the heads of which is fixed on a shaft (33)

subjected to an alternating movement given thereto by a lever (45).

7. A plant as claimed in claim 1, characterised in that said belt is driven on guide cylinders (22, 22') of said oscillating arm (19) as well as on at least a reversing cylinder (27) and a tensioning cylinder (23) by means of a continuously rotating drum (26), arranged inside said barrel (12).

8. A plant as claimed in claim 7, characterised in that driving shaft (34) of said drum (26) is eccentrically located with respect to the geometrical axis of said barrel (12).

9. A plant as claimed in claim 8, characterised in that said barrel is made of a ring-shaped base member (11) bearing said roller-up mandrels (1-10) at its periphery.

10. A plant as claimed in claim 9, characterised in that said ring-shaped base member 11 centrally bears an intermittently driven gear (44).

11. A plant as claimed in claim 10, characterised in that said gear (44) is a chain wheel.

12. A plant as claimed in claim 10, characterised in that driving of shaft (34) of drum (26) is made through two gears (38,39) meshing together, the last of these gears being fixed on a collar (40) supporting at its opposite end a pulley (41) cooperating with a continuously driven serrated belt.

* * * * *